Dec. 29, 1942.  F. L. RUPLEY  2,306,469

AIR GAUGE

Filed Dec. 29, 1941

Inventor
Fred L. Rupley
By Blackmor, Spencer & Flint
Attorney

Patented Dec. 29, 1942

2,306,469

UNITED STATES PATENT OFFICE 2,306,469

AIR GAUGE

Fred L. Rupley, Rockford, Ill., assignor to General Motors Corporation, Detroit, Mich., a corporation of Delaware Application December 29, 1941, Serial No. 424,775

7 Claims. (Cl. 33—168)

This invention relates to gauging means and more specifically to apparatus for gauging dimensions operated by the leakage of air.

This application relates to the same type of gauging means disclosed in my copending application S. N. 408,047, filed August 23, 1941. As described in that application, air under constant pressure is utilized, which air is allowed to escape from certain predetermined openings. When a piece to be gauged or measured is placed in juxtaposition to the openings, the flow of air is cut down from an unrestricted amount to an amount dependent upon the distance between the piece being gauged and the gauging or leakage member. If this distance is within limits the amount of air which is allowed to escape will cause a gauge to read certain amounts. However, in the type disclosed in my copending application, the gauging member had openings therein through which air was freely allowed to escape to the atmosphere when no gauging piece was present which caused some loss of compressed air from the source and also considerable noise.

It is therefore an object of my present invention to provide gauging means which when no gauged piece is in test position does not allow air to escape therefrom.

It is a further object of my invention to provide gauging means which when the test piece is placed in juxtaposition will be operated to allow air to escape for gauging purposes.

It is a still further object of my invention to provide such means as will be simple and yet rugged.

With these and other objects in view which will become apparent as the specification proceeds, my invention will be best understood by reference to the following specification and claims and the illustrations in the accompanying drawing, in which:

Figure 2 shows a side elevation partly in section disclosing a modified form of my invention for gauging pieces of different configuration; and.

Figure 1:
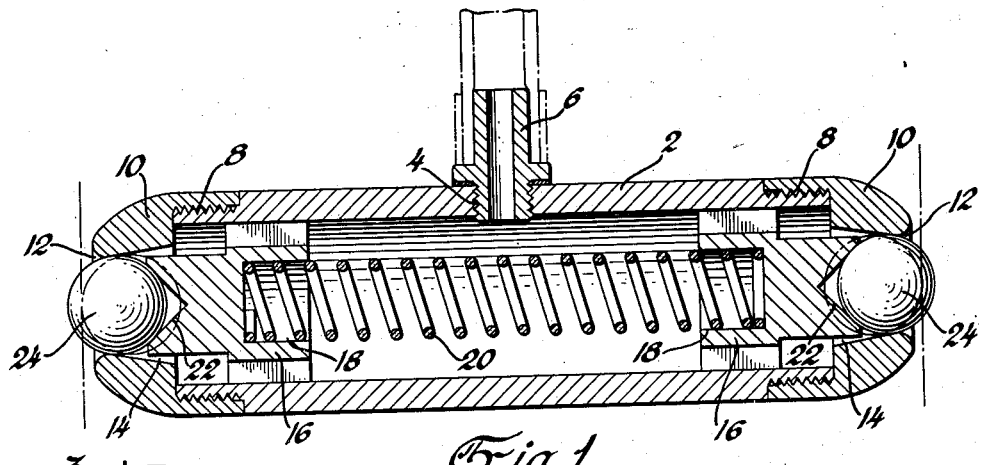
Figure 1 shows a sectional view taken through a gauging device of my invention.

Referring now more specifically to the drawing, in Figure 1 there is disclosed an elongated cylindrical casing 2 which has a tapped opening 4 in one surface thereof into which is threaded a nozzle 6 which is connected to a source of air under pressure. Each end of the casing 2 is externally threaded as at 8 and a tapered nose piece 10 is threaded thereon which tapered piece has a central aperture 12 through which air may escape. This central aperture 12 is connected to the interior of the casing 2 by a tapered hole 14 which extends back through the tapered nose piece 10. Within the enclosure of the casing are slidable blocks 16, one in each end, which have a central aperture 18 in the faces which are directed toward each other, said openings housing opposite ends of a compression spring 20 which forces the two blocks apart.

The forward or outer face of each of these blocks has a V notch 22 cut therein which is adapted to be forced against a ball 24 whose diameter is slightly larger than the circumference of the opening 12 adjacent the tip of the nose, but smaller than the circumference as the tapered portion proceeds within the casing. Thus when the spring 20 forces the two slidable blocks outwardly, they force the balls 24 into the openings and seal the casing against air leakage. When, however, a test piece which is being tested for internal diameter is forced over the outside of the housing, as shown by the dot and dash lines, these balls 24 are forced inwardly to their dotted line position and in this instance air is allowed to escape past them and the pieces gauged by the apparatus shown in my copending application.

Figure 2:
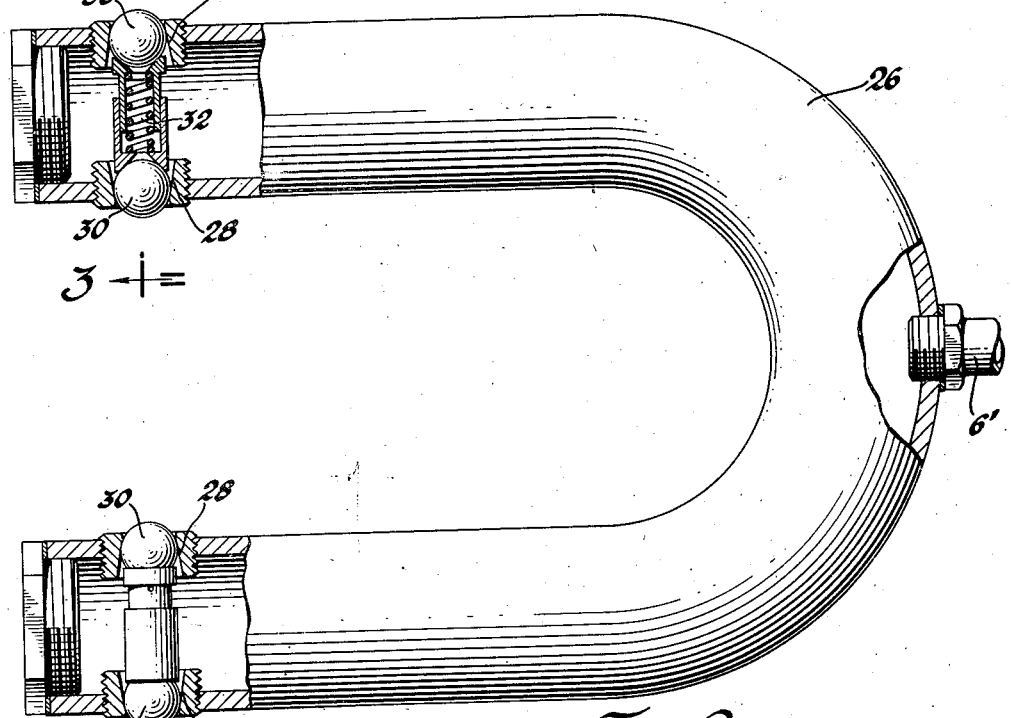
Figure 3:
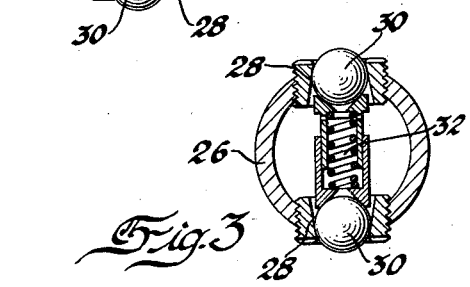
Figure 3 is a sectional view taken on line 3—3 of Figure 2.

If, however, it is desired to gauge pieces for external diameter instead of internal, then it would be necessary to provide such a means as shown in Figure 2, the casing 26 in this instance being in the form of a hollow horseshoe, the air being introduced at one end through a similar nozzle 6' and the tips of the horseshoe having incorporated a similar ball check device which consists of a plurality of tapered orifices 28 which are threaded into openings in the sides of the casing. As before, these orifices have located therein ball checks 30 which are spring biased into the throats of the openings by a compression spring 32. Thus, if we desire to gauge a piece for its external diameter, it may be inserted between the two legs of the horseshoe and gauged between the two ball checks on the inner surface. If we desire to gauge pieces for external diameter, they may be either inserted over one leg, or if of very large diameter, over the outside of both. The dimensions of any of these pieces are of course dependent upon the work which it is desired to gauge. In this manner I have provided a system of gauging whereby no excess air is allowed to escape during periods of non-use and which accurately gauges members which are slid thereover during test periods.

I claim:

1. In gauging means, a casing having tapered openings at opposite sides thereof, means mounted within each opening having a cross sectional area of the same quantity as an intermediate portion of the taper to act as a check valve, means for introducing fluid under pressure into the casing and spring biasing means adapted to maintain the checking means in contact with the interior surface of the openings to maintain fluid pressure within the casing.

2. In gauging means, a casing having a plurality of tapered openings therein, means for introducing fluid under presure into the casing, check valve means located in each of the tapered openings to prevent the escape of the fluid and each having a surface which extends out through the opening and spring biasing means to maintain the valve means closed whereby any external pressure on the parts of the valves which extend beyond the casing will force them inwardly against the spring pressure and allow the fluid to escape.

3. In gauging means, a hollow casing having opposed tapered openings therein, circular ball check means in each opening to act as check valves but of such diameter that a portion of the spherical surface may extend beyond the casing, spring biasing means within the casing to maintain the balls in the tapered portion and fluid pressure supply means for the casing whereby the fluid pressure is maintained within the casing unless exterior means forces the balls inwardly to allow the fluid to escape.

4. In gauging means, an enclosure under fluid pressure having a plurality of spaced tapered openings therein, check means having an exposed surface slidable within the openings to control the escape of fluid therethrough and biasing means to normally maintain the check means in closed position, but allowing them to be forced inwardly upon the application of external force.

5. In gauging means, an enclosure under fluid pressure having a plurality of spaced tapered openings therein, ball check means within each opening having a portion thereof which extends beyond the enclosure, biasing means to maintain the ball checks tightly within the openings to prevent fluid escape except when the same are forced inwardly by external force of means to be gauged.

6. In gauging means, a hollow casing under air pressure having a plurality of spaced tapered openings therein, ball check means in each tapered opening to prevent the flow of air therefrom but having a surface which projects beyond the casing, spring means to force the ball checks outwardly in the tapered openings, capable of yielding under external pressure of a piece to be gauged.

7. In gauging means, a hollow casing having a plurality of connected portions and a plurality of tapered openings in each portion, check valve means in each opening having a surface extending beyond the casing and spring biasing means to maintain the valve means in its sealing position unless acted upon by some exterior force against the outer surface, whereby pieces may be checked for either inside or outside dimensions between the casing portions.

FRED L. RUPLEY.